US011231457B1

(12) United States Patent
Sarusi et al.

(10) Patent No.: US 11,231,457 B1
(45) Date of Patent: Jan. 25, 2022

(54) CONTINUOUS INTEGRATION FOR INTEGRATED CIRCUIT DESIGN

(71) Applicant: Amazon Technologies, Inc., Seattle, WA (US)

(72) Inventors: Adiel Sarusi, Hod-Hasharon (IL); Itay Poleg, Haifa (IL)

(73) Assignee: Amazon Technologies, Inc., Seattle, WA (US)

( * ) Notice: Subject to any disclaimer, the term of this patent is extended or adjusted under 35 U.S.C. 154(b) by 268 days.

(21) Appl. No.: 16/366,817

(22) Filed: Mar. 27, 2019

(51) Int. Cl.
*G01R 31/28* (2006.01)
*G06F 30/367* (2020.01)

(52) U.S. Cl.
CPC ....... *G01R 31/2896* (2013.01); *G06F 30/367* (2020.01)

(58) Field of Classification Search
None
See application file for complete search history.

(56) References Cited

U.S. PATENT DOCUMENTS 6,088,693 A * 7/2000 Van Huben ......... G06F 16/2343
2008/0222580 A1* 9/2008 Banerjee ................. G06F 30/30
716/136

\* cited by examiner

*Primary Examiner* — Roy Y Yi
(74) *Attorney, Agent, or Firm* — Klarquist Sparkman, LLP

(57) ABSTRACT

Technologies are provided for feature-based continuous integration. A feature manifest can be created that identifies versions of program/hardware definition assets (such as source code files and register-transfer-level (RTL) definition files) that are stored in separate source control repositories but are related to a particular application or hardware feature. The identified versions of the assets can be retrieved from the separate repositories and, optionally, built, deployed, and/or tested. For example, a hardware feature manifest can be defined that identifies a version of an RTL definition for a hardware component stored in a first repository and a version of a verification program stored in a second repository. The hardware feature manifest can be used to retrieve the identified RTL definition from the first repository and to deploy it. The identified version of the verification program can be retrieved from the second repository and used to test the deployed RTL definition.

16 Claims, 6 Drawing Sheets

CONTINUOUS INTEGRATION FOR INTEGRATED CIRCUIT DESIGN

BACKGROUND

The phrase "continuous integration" typically refers to a software development practice in which multiple developers merge their changes to application assets (such as source code files) into a shared source control repository. The source control repository may be managed by a source management system (such as Git, Subversion, or Mercurial). The application assets are retrieved from the shared source control repository and undergo a build process (often at least once per day). The build process can include compilation and/or packaging operations that transform the retrieved application assets into one or more executable applications. In at least some cases, the one or more executable applications may then be deployed to one or more computers where they can be executed and possibly tested. In at least some continuous integration systems, the process of retrieving the application assets from the repository, building the assets, and deploying the built application can be automated. In some cases, the act of committing changes to one or more assets in the source control repository triggers the continuous integration process.

DETAILED DESCRIPTION

Figure 1:
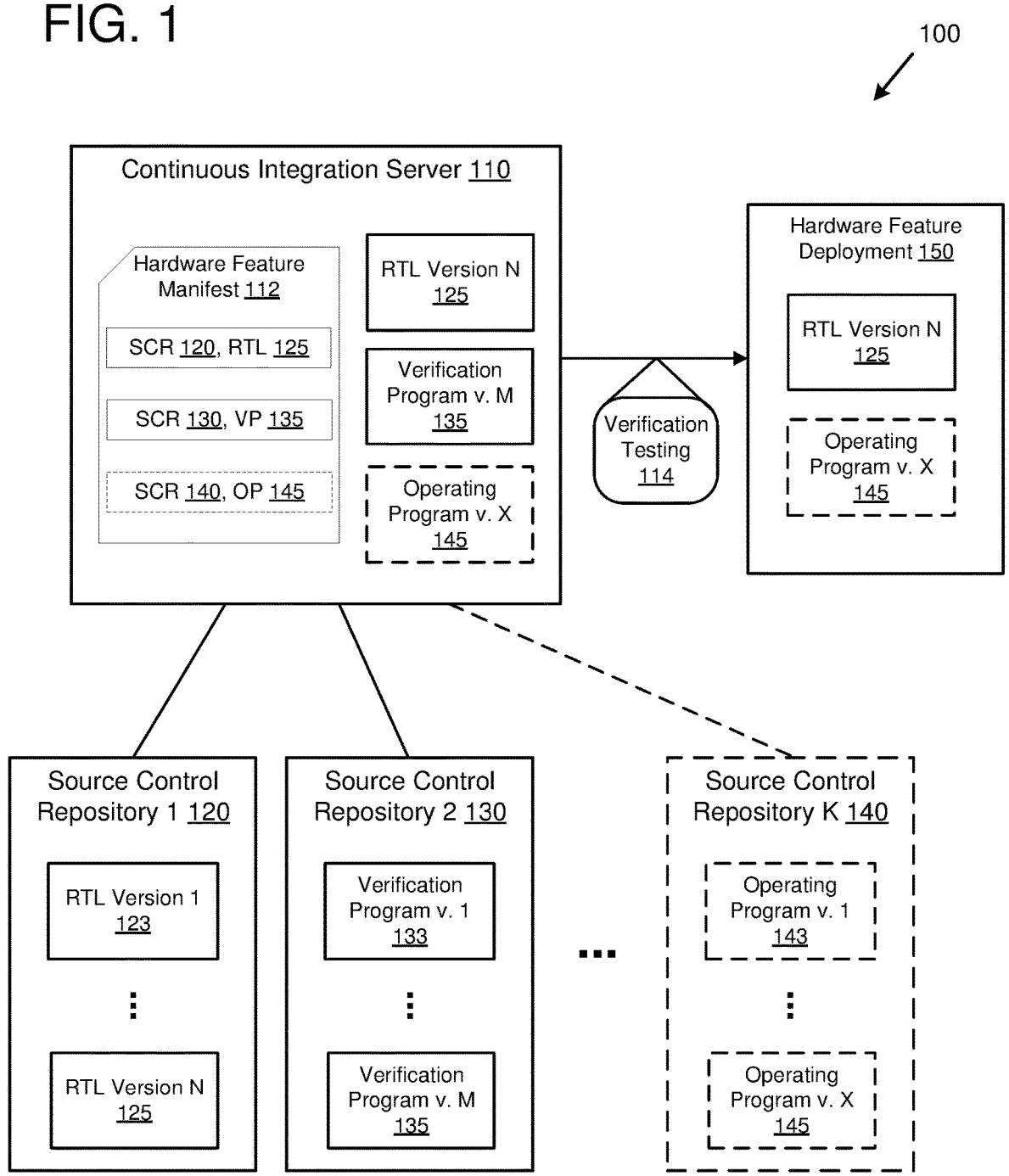
FIG. 1 is a system diagram depicting an example system for feature-based continuous integration.

Most previous approaches to continuous integration are premised on the use of a single source control repository. A source control repository normally tracks each set of committed changes as a distinct "version" of the repository and associates each version with a version identifier (such as a commit number, or the like). This version identifier can be used by a continuous integration process to retrieve a specific version of the repository (e.g., to retrieve versions of all the assets stored in the repository as they existed when a particular set of changes associated with the version identifier were committed to the repository).

However, this process breaks down when more than one source control repository is involved. Most source management systems do not provide a way to correlate changes made in separate source control repositories. Moreover, if multiple source management systems are used, there is no way for the separate source management systems to correlate changes made in their respective repositories. This can make it difficult to implement continuous integration practices for projects that involve more than one source conde repository.

There are various reasons why a project might involve more than one source control repository. For example, large and/or complex projects may have multiple development teams which largely work independently, and thus prefer to keep their code bases in separate repositories. As another example, some source management systems have a practical limit to the number of commits that can be tracked for a repository before performance starts to degrade. Thus, large code bases that experience high volumes of commits may necessarily have to be split up across multiple repositories. As another example, a hardware-development project may involve one or more repositories storing versions of register-transfer-level (RTL) definitions for one or more hardware devices, one or more additional repositories storing versions of verification programs for testing the one or more hardware devices, and possibly one or more additional repositories storing versions of programs for operating the one or more hardware devices.

In scenarios such as these, it may be impractical to use conventional continuous integration techniques. Conventional continuous integration could potentially be performed on a per-repository basis. However, if a new feature required changes to multiple repositories, then building, deploying, and testing the new feature would require manual coordination between the developers responsible for the separate repositories.

At least some of the embodiments of the technologies described herein solve these problems by providing feature-based continuous integration. A feature manifest can be defined that identifies versions of application assets stored in separate source control repositories. The identified versions of application assets can be logically associated with a particular feature. A continuous integration server can be configured to analyze the feature manifest, retrieve the identified versions of the assets from the separate source control repositories, and then build and/or deploy the retrieved versions of the assets.

For example, a hardware feature manifest can identify a version of an RTL definition for a hardware device, stored in a first source control repository, that implements a particular hardware feature. The hardware feature manifest can further identify a version of a verification program, stored in a second source control repository, that includes instructions for testing the particular hardware feature. Optionally, the hardware feature manifest may further identify a version of an operating program, stored in a third source control repository, that is executed by the hardware device and implements at least part of the particular feature's functionality.

A continuous integration server can analyze the hardware feature manifest, retrieve the identified version of the RTL definition from the first source control repository, and deploy it by simulating, emulating, or creating the hardware device using the retrieved RTL definition. Optionally, the continuous integration server may retrieve the identified version of the operating program from the third source control repository, build the retrieved version of the operating program, and install it where it can be used by the simulated, emulated, or created hardware device. The continuous integration server can retrieve the identified version of the verification program from the second source control repository, build the version of the verification program, and use it to test the simulated, emulated, or created hardware device.

Although the examples given herein pertain to the application of feature-based continuous integration to the development of hardware components (such as computing hardware), at least some of the techniques described herein can be applied in other contexts where multiple source control repositories are used. For example, consider a scenario where a database, multiple back-end services, an application server, and a user interface are developed by separate teams of developers using separate source control repositories. If a new feature of this system requires changes to be made across several components of the system (e.g., the new feature requires changes to the database, one or more of the services, the application server, and the user interface), then a feature manifest can be used to identify the particular versions of source code assets in each of the separate repositories that are required to deploy the new feature's functionality. Using such a feature manifest, a continuous integration server can retrieve the identified versions of the source code assets from each of the respective repositories and use them to deploy a version of the system that includes all the necessary components to support the new feature.

FIG. 1 is a system diagram depicting an example system 100 for feature-based continuous integration. The example system 100 comprises a continuous integration server 110, and a plurality of source control repositories 120-140. The continuous integration server 110 is configured to use a hardware feature manifest 112 to retrieve versions of different source assets from the separate source control repositories 120-140, but which are all associated with a particular feature.

For example, in FIG. 1 the source control repository 120 stores a plurality of versions 123-125 of a register-transfer-level (RTL) definition for a hardware device, and the source control repository 130 stores a plurality of versions 133-135 of a program for testing the hardware device. Example hardware devices include (but are not limited to) integrated circuits. An RTL definition can be an abstraction of an integrated circuit that is written in a hardware description language (HDL), such as Verilog or VHDL.

The continuous integration server 110 can use the hardware feature manifest 112 to retrieve one of the versions 123-125 of the RTL definition from the source control repository 120 and to retrieve one of the versions 133-135 of the verification program from the source control repository 130. The retrieved versions of the RTL definition and the verification program can be associated with a particular feature of the hardware device.

For example, in FIG. 1 the hardware feature manifest 112 identifies version 125 of the RTL definition stored in the source control repository 120, and the version 135 of the verification program stored in the source control repository 130. Based on the hardware feature manifest 112, the continuous integration server 110 can retrieve the version 125 of the RTL definition from the source control repository 120. Based on the hardware feature manifest 112, the continuous integration server 110 can retrieve the version 135 of the verification program from the source control repository 130.

The continuous integration server 110 can be configured to create a hardware feature deployment 150 using the version of the RTL definition retrieved from the source control repository 120. The hardware feature deployment 150 can comprise a simulation or emulation of a hardware device using the retrieved version of the RTL definition.

Additionally or alternatively, a hardware device can be created based on the retrieved version of the RTL definition. For example, the retrieved version of the RTL definition can be converted into a bitstream that can be provided to a programmable logic device. A programmable logic device can comprise one or more electronic components that can be used to create reconfigurable digital circuits. Example programmable logic devices include, but are not limited to, field programmable gate arrays (FPGAs). In at least some embodiments, the bitstream that is generated by the implementation process can be uploaded to an FPGA to configure one or more programmable logic blocks and/or interconnects in the FPGA to create a digital circuit. The resulting programmed logic device can comprise an application-specific integrated circuit (ASIC) embodying at least the hardware feature defined by the retrieved version of the RTL definition.

After the hardware feature deployment 150 has been created, the continuous integration server 110 can use the retrieved version of the verification program to perform verification testing 114 against the hardware feature deployment 150. For example, in an embodiment where the hardware device is being simulated or emulated using the retrieved version of the RTL definition, the simulated or emulated version of the hardware device can be tested using the retrieved version of the verification program. In an embodiment where a hardware device is created based on the retrieved version of the RTL definition, the created hardware device can be tested directly using the retrieved version of the verification program.

Although the continuous integration server 110 is depicted in FIG. 1 as performing the verification testing 114, in at least some embodiments where the hardware feature deployment 150 is created in a separate simulation environment, the retrieved version (or a compilation of the retrieved version) of the verification program can be provided to the separate simulation environment, where one or more other computing devices can execute it against the hardware feature deployment 150.

Thus, by using a hardware feature manifest (e.g., 112) the continuous integration server 110 can deploy a version of the RTL definition (e.g., 125) that defines a particular feature of a hardware device and can execute a version of a verification program comprising instructions to test the particular feature of the hardware device, even though the versions of the RTL definition and the verification program are stored in separate source control repositories (e.g. 120 and 130).

Optionally, the example system 100 can comprise additional source control repositories. For example, the example system 100 can include the source control repository 140 storing a plurality of versions 143-145 of a program for operating all or part of the hardware device (a.k.a., an "operating program") defined by the RTL definition stored in the source control repository 120. For example, the operating program can include all or part of a firmware for the hardware device.

The hardware feature manifest 112 can identify a version of the program for operating the hardware device that is stored in the source control repository 140. For example, the hardware feature manifest 112 can identify version 145 of the operating program stored in the source control repository 140. In such a scenario, the continuous integration server 110 can retrieve the version 145 of the operating program. The continuous integration server 110 can use retrieved version of the operating program when creating the hardware feature deployment 150. For example, in an embodiment where the hardware device is simulated or emulated using the retrieved version of the RTL definition, the retrieved version of the operating program (e.g., 145) can also be used as part of the simulation or emulation. In an embodiment where a hardware device is created using the retrieved version of the RTL definition, the retrieved version of the operating program can be installed in a memory or storage where it can be accessed by the hardware device.

Although three source control repositories (120-140) are depicted in FIG. 1, other numbers of source control repositories are possible. For example, multiple verification programs for testing the hardware device can be stored in separate source control repositories. Additionally or alternatively, multiple operating programs for use in performing various functions of the hardware device can be stored in separate repositories. Additionally or alternatively, separate RTL definitions which define various components of the hardware device can be stored in separate source control repositories.

In at least some embodiments, the continuous integration server 110 can be configured to create the hardware feature manifest 112. For example, the continuous integration server 110 can receive a request (such as a computer network request received from another computing device) to create a hardware feature manifest. The request can comprise information identifying a version of the RTL definition stored in the source control repository 120, and a version of the verification program stored in the source control repository 130. In an embodiment where the source control repository 140 stores a plurality of versions 143-145 of the operating program, the request can comprise information identifying one of the versions (e.g., 145) of the operating program. The continuous integration server 110 can be configured to create the hardware feature manifest 112 based on the information received in the request.

The continuous integration server 110 can be configured to store the hardware feature manifest 112 in a computer readable storage medium. In at least some embodiments, the continuous integration server 110 can store the hardware feature manifest 112 in a source control repository. In such an embodiment, the source control repository can store a plurality of versions of the hardware feature manifest.

The plurality of source control repositories 120-140 can be managed by one or more source management systems (such as instances of the Git source management system, instances of the Subversion (SVN) source management system, instances of the Mercurial source management system, or the like). For example, the source control repositories 120 and 130 can be managed by a single source management system. Alternatively, the source control repository 120 and the source control repository 130 can be managed by separate source management systems.

As used herein, the term "source control repository" refers to one or more files that are managed by a source management system as a logical unit. In at least some cases, the repository corresponds to a directory structure containing one or more files and/or sub-directories. The source management system tracks changes made to the files and/or directories in the repository as distinct versions of the repository. For example, some source management systems assign a distinct identifier to each set of changes that are committed to the repository (such as a commit number, or the like). The source management system ensures that only one set of changes is committed to the repository at a time, so the identifier associated with a set of changes can be used to identify a specific version of the files and sub-directories stored in the repository. Thus, a "version," as used herein, can refer to one or more changes made to one or more files which are stored as commits to a source control repository. Examples of repositories include Git repositories, SVN repositories, Mercurial repositories, and the like).

In any of the examples described herein, an RTL definition can comprise a logical design for a digital integrated circuit, such as a microprocessor, an FPGA, an ASIC, an SOC, a memory, or some combination thereof. A logical design can comprise one or more logical representations of a circuit's functionality, which can include RTL abstractions. In at least some embodiments, at least part of the circuit design can comprise statements written in an HDL, such as Verilog, VHDL, or the like.

Figure 2:
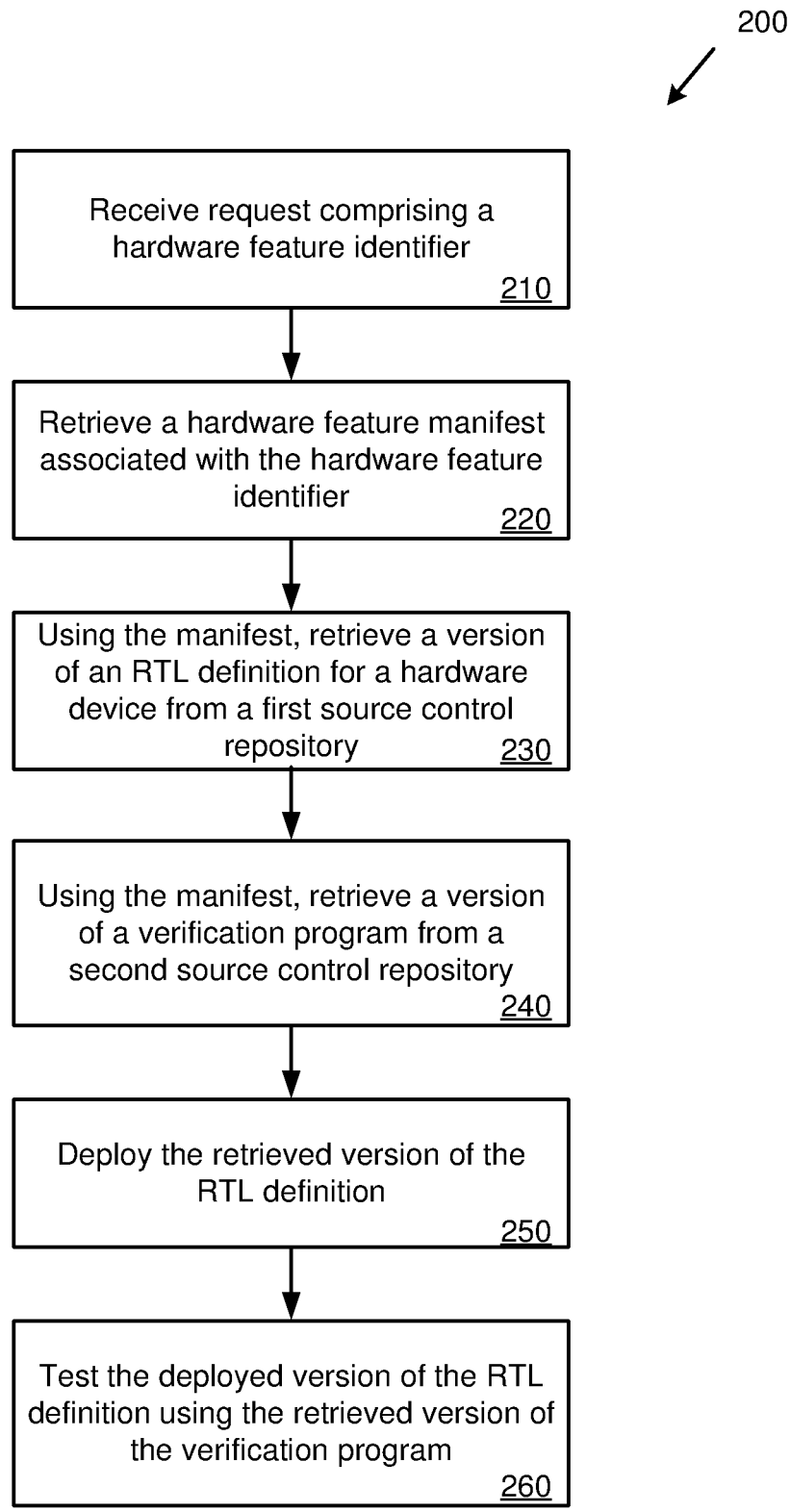
FIG. 2 is a flowchart of an example method for performing feature-based continuous integration.

FIG. 2 is a flowchart of an example method 200 for performing feature-based continuous integration. Any of the example systems described herein can be used to perform the example method 200. For example, the continuous integration server 110, depicted in FIG. 1, can be used to perform all or part of the example method 200.

Figure 3:
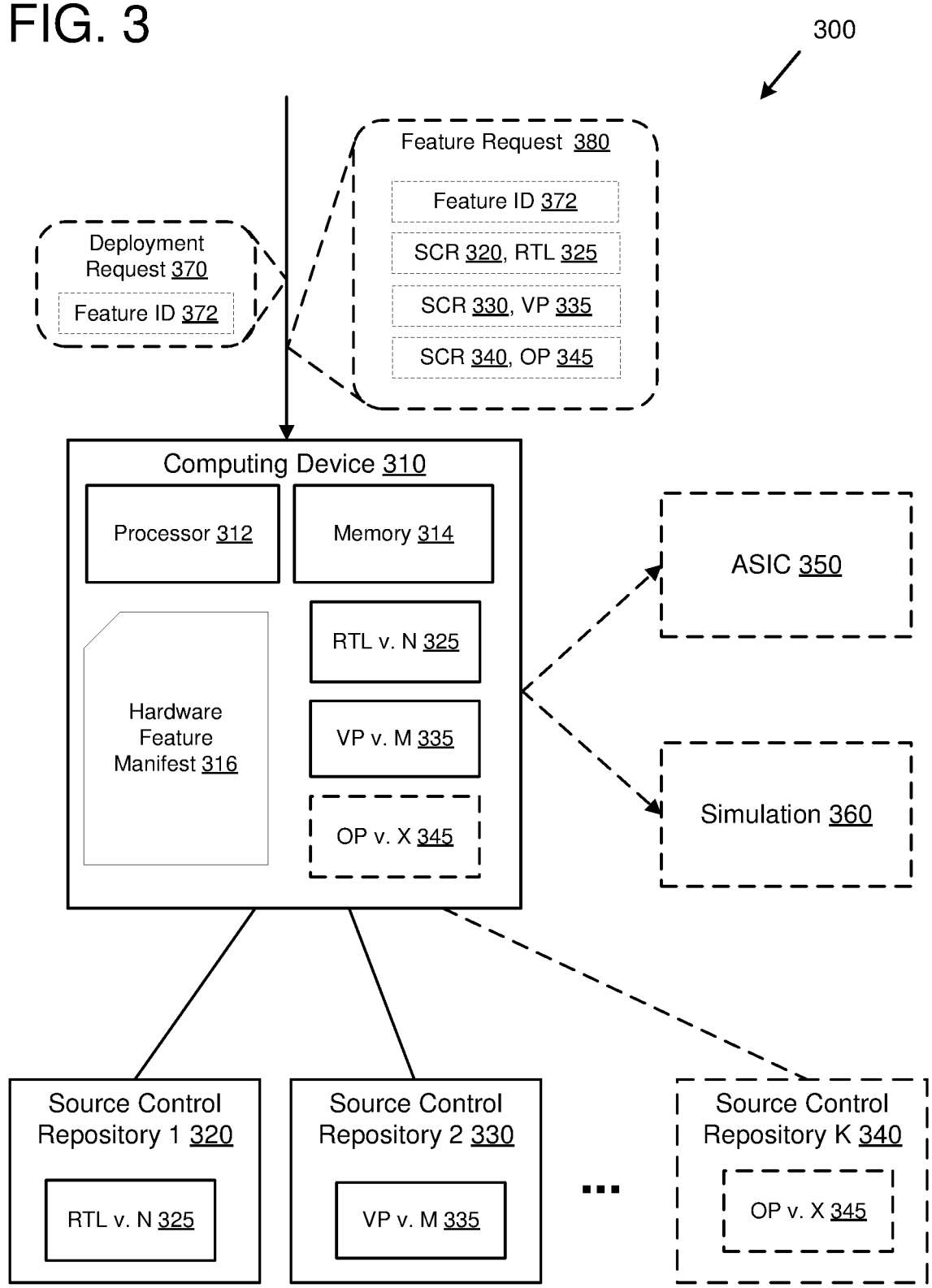
FIG. 3 is a system diagram depicting an example system comprising a computing device configured to perform feature-based continuous integration operations.

As another example, the computing device 310, depicted in FIG. 3, can be used to perform all or part of the example method 200. FIG. 3 is a system diagram depicting an example system 300 comprising a computing device 310 configured to perform feature-based continuous integration operations. The computing device 310 comprises a processor 312 and a memory 314. The memory 314 can store instructions that, when executed by the processor 312, cause the computing device 310 to perform operations related to feature-based continuous integration.

Referring to FIG. 2, at 201, a request comprising a hardware feature identifier is received. The request can be a request to deploy an instance of a hardware device comprising a feature (for example, a gate array, a clock tree, etc.) associated with the feature identifier. For example, in FIG. 3, the deployment request 370, comprising a feature identifier 372, can be received by the computing device 310. In at least some embodiments, the request can be received via a computer network.

Referring to FIG. 2, at 220, a hardware feature manifest associated with the hardware feature identifier is retrieved. The hardware feature manifest can identify a version of an RTL definition, for a hardware device, which is stored in a first source control repository. The hardware feature manifest can also identify a version of a verification program, for testing the hardware device, which is stored in a second source control repository that is separate from the first source control repository.

For example, the computing device 310 in FIG. 3 can determine that the hardware feature manifest 316 is associated with the feature ID 372 received in the deployment request 370. The computing device 310 can retrieve the hardware feature manifest 316, for example, from the memory 314 and/or from a storage device connected to the computing device 310 (not shown). In at least one embodiment, the hardware feature manifest 316 can be retrieved from a source control repository. The hardware feature manifest 316 can identify a version 325 of an RTL definition for a hardware device stored in a source control repository 320. The hardware feature manifest 316 can also identify a version 335 of a verification program for testing the hardware device that is stored in a source control repository 330.

Referring to FIG. 2, at 230, the hardware feature manifest is used to retrieve a version of an RTL definition for a hardware device from a first source control repository. For example, the computing device 310, depicted in FIG. 3, can retrieve the version 325 of the RTL definition stored in the source control repository 320. Although only a single version (325) is depicted in FIG. 3, it is possible for the source control repository 320 to store a plurality of versions of the RTL definition. For example, the RTL definition can comprise a plurality of files stored in the source control repository 320. Each change that is made to one or more of the files in the source control repository 320 can be tracked as a distinct version of the RTL definition.

Referring to FIG. 2, at 240, the hardware feature manifest is used to retrieve a version of a verification program from a second source control repository. For example, the computing device 310, depicted in FIG. 3, can retrieve the version 335 of the verification program stored in the source control repository 330. Although only a single version (335) is depicted in FIG. 3, it is possible for the source control repository 320 to store a plurality of versions of the verification program. For example, the verification program can comprise a plurality of files stored in the source control repository 330. Each change that is made to one or more of the files in the source control repository 330 can be tracked as a distinct version of the verification program.

In at least some embodiments, retrieving a version of a source code asset (such as a version of an RTL definition, a version of a verification program, etc.) from a source control repository comprises issuing one or more commands to a source management system (such as Git, SVN, Mercurial, or the like) which manages the source control repository. For example, a command can be issued to the source management system, requesting a particular version of the source code asset(s). The identifier in the hardware feature manifest that identifies a particular version of the source code asset can be provided as part of a command that is transmitted to the source management system. In at least some such embodiments, the first and second source control repositories can be managed by separate source management systems. In such an embodiment, the hardware feature manifest can identify the source management system which manages each of the respective source control repositories.

Optionally, the hardware feature manifest can further identify a version of a program for operating all or part of the hardware device (a.k.a., an "operating program") that is stored in a third source control repository. For example, the identified version of the operating program can comprise instructions for use in performing functions of the hardware feature that is associated with the hardware feature identifier. The hardware feature manifest can be used to retrieve the identified version of the operating program from the third source control repository.

For example, the hardware feature manifest 316, depicted in FIG. 3, can identify a version 345 of an operating program stored in a source control repository 340. The computing device 310 can use the hardware feature manifest 316 to retrieve the version 345 of the operating program stored in the source control repository 340.

Referring to FIG. 2, at 250, the retrieved version of the RTL definition is deployed. Deploying the retrieved version of the RTL definition can comprise simulating the hardware device using the retrieved version of the RTL definition. For example, the computing device 310, depicted in FIG. 3, can create a simulation 360 of the hardware device using the retrieved version 325 of the RTL definition.

Additionally or alternatively, deploying the retrieved version of the RTL definition can comprise creating an application-specific integrated circuit (ASIC) using the retrieved version of the RTL definition. For example, the computing device 310 can create an ASIC 350 using the retrieved version 325 of the RTL definition. Creating the ASIC 350 can comprise programming a field programmable gate array (FPGA) using the retrieved version 325 of the RTL definition.

If the hardware feature manifest identified a version of an operating program, the retrieved version of the operating program can be installed along with the deployed RTL definition. For example, the retrieved version 345 of the operating program can be executed as part of the simulation 360 and/or installed in a memory or storage (not shown) which is accessible by the ASIC 350.

Referring to FIG. 2, at 260, the deployed version of the RTL definition is tested using the retrieved version of the verification program. The retrieved version of the verification program can be used to determine whether or not the retrieved version of the RTL definition correctly implements the hardware feature associated with the hardware feature manifest.

For example, the computing device 310, depicted in FIG. 3, can use the retrieved version 335 of the verification program to test the simulated version of the computing hardware 360 and/or the ASIC 350. In an embodiment where the ASIC 350 is created by programming an FPGA, the retrieved version 335 of the verification program can be executed against the programmed FPGA.

At least some of the commands sent by the verification program can be used to test the hardware feature associated with the hardware feature identifier. If a version of an operating program was installed, all or part of the commands sent by the verification program can be processed by the operating program.

In at least some embodiments, the example method 200 can further comprise receiving a request to create the hardware feature manifest. Such a request can be received, for example, via a computer network from another computing device. The request can comprise the hardware feature identifier, an identifier for the version of the RTL definition stored in the first source control repository, and an identifier for the version of the verification program stored in the second source control repository. Optionally, the request can comprise an identifier for a version of an operating program for the hardware device that is stored in a third source control repository.

The hardware feature manifest can be created using the identifier for the version of the RTL definition stored in the first source control repository and the identifier for the version of the verification program stored in the second source control repository. The created hardware feature manifest can then be associated with the hardware feature identifier received in the request.

For example, the computing device 310, depicted in FIG. 3, can receive the feature request 380, comprising information identifying the version of the RTL definition 325 stored in the source control repository 320 and the version of the verification program 335 stored in the source control repository 330. The computing device 310 can generate the hardware feature manifest 316 using the information in the feature request 380. Optionally, the feature request 380 can comprise information identifying the version of the operating program 345 stored in the source control repository 340. In such a scenario, the computing device 310 can use this additional information when generating the hardware feature manifest 316.

The feature request 380 can comprise the feature identifier 372. After creating the hardware feature manifest 316, the computing device 310 can store the hardware feature manifest 316 in association with the feature identifier 372.

Figure 4:
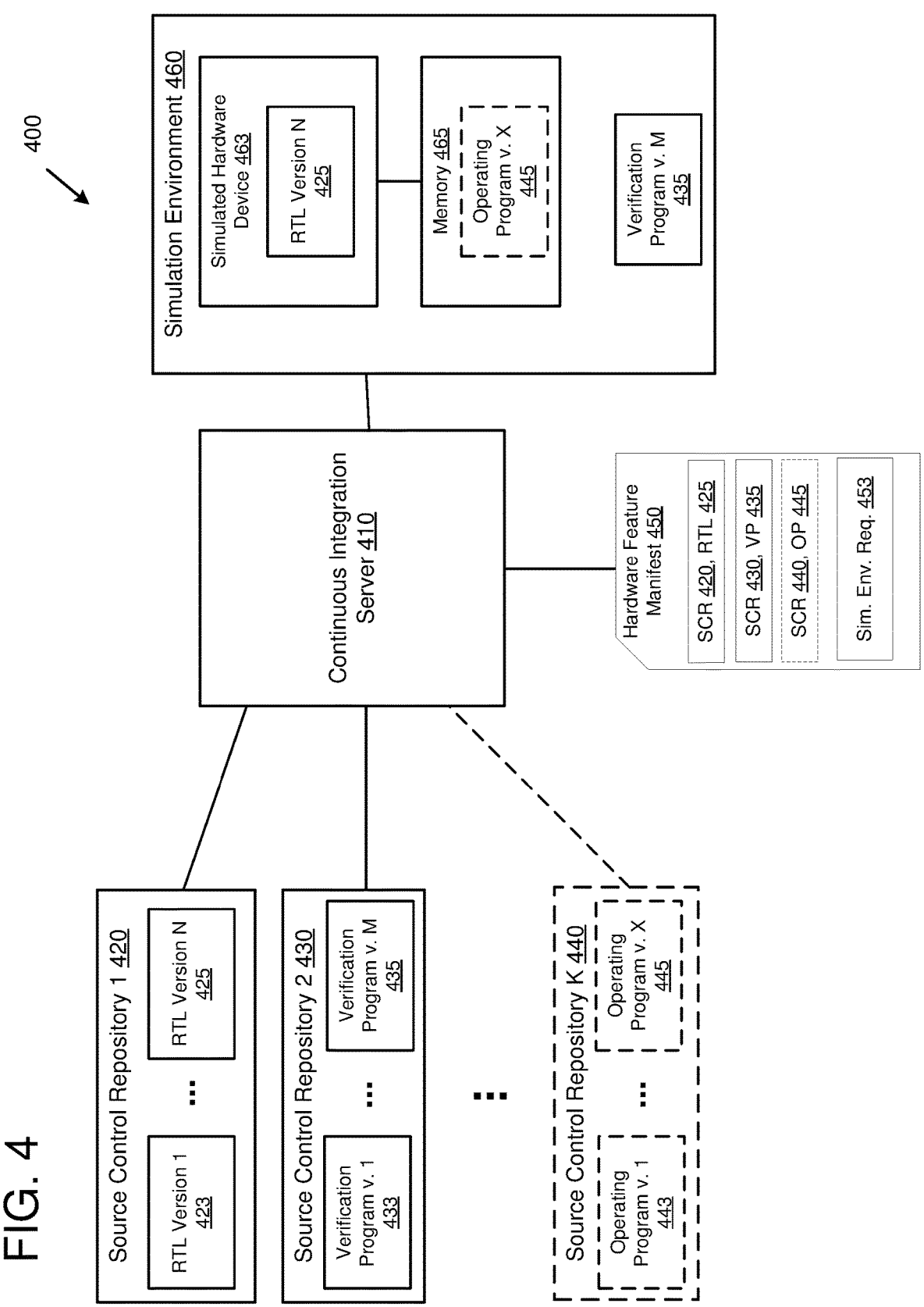
FIG. 4 is a system diagram depicting an example system comprising a continuous integration server and a simulation environment.

FIG. 4 is a system diagram depicting an example system 400 comprising a continuous integration server 400 and a simulation environment 460. The continuous integration server 410 and the simulation environment 460 can be used to perform feature-based continuous integration.

The continuous integration server 410 is configured to access a plurality of source control repositories (e.g., 420-440). The source control repository 420 stores a plurality of versions 423-425 of an RTL definition for a hardware device. The source control repository 430 stores a plurality of versions 433-435 of the verification program for testing the hardware device. Optionally, the source control repository 440 stores a plurality of versions 443-445 of an operating program for use in performing all or part of the functionality of the hardware device.

The continuous integration server 410 is configured to access a hardware feature manifest 450 associated with a particular feature of the hardware device. The hardware feature manifest 450 identifies a version (e.g., 425) of the RTL definition stored in the source control repository 420, which implements the particular feature of the hardware device. The hardware feature manifest 450 also identifies a version (e.g., 435) of the verification program stored in the source control repository 420, which comprises instructions for testing the particular feature of the hardware device. Optionally, the hardware feature manifest 450 identifies a version (e.g., 445) of the operating program stored in the source control repository 440, which comprises instructions used to perform at least part of the functionality of the particular feature.

The hardware feature manifest 450 further comprises a simulation environment requirement 453. The simulation environment requirement 453 can identify one or more resources (such as computing resources, memory resources, etc.) that are required to simulate the version of the hardware device defined by the hardware feature manifest 450. Example computing resources include a computer processor specification (e.g., including a make/model of a computer processor, a processor speed, and/or a processor instruction set identifier), or the like. Additionally or alternatively, the computing resource can comprise one or more file paths to one or more files required to simulate the version of the hardware device (such as one or more verification programs, one or more operating programs, one or more programs for performing hardware simulation, etc.). Additionally or alternatively, the simulation environment requirement can specify a number of server instances that should be used to simulate the hardware device.

The continuous integration server 410 can be configured to identify a simulation environment (e.g., 460) which satisfies the simulation environment requirement 453 and to use the identified simulation environment 460 to deploy the version of the hardware device defined by the hardware feature manifest 450. For example, the simulation environment can comprise one or more server computers configured to simulate hardware devices. The continuous integration server 410 can be configured to identify a server computer that satisfies the simulation environment requirement 453 and to use the identified server computer to simulate the hardware device using the version of the RTL definition identified by the hardware feature manifest 450.

The continuous integration server 410 is configured to use the hardware feature manifest 450 to retrieve the identified version 425 of the RTL definition from the source control repository 420 and to deploy the retrieved version 425 of the RTL definition in the simulation environment 460. Deploying the retrieved version 425 of the RTL definition can comprise creating a simulated hardware device 463 based on the version 425 of the RTL definition.

If the hardware feature manifest 450 identifies a version (e.g., 445) of an operating program stored in the source control repository 440, the continuous integration server 410 can retrieve the version 445 of the operating program and install it in a location in the simulation environment 460 where it is accessible by the simulated hardware device 463. For example, the continuous integration server 410 can install the retrieved version 445 of the operating program in a memory 465 which can be accessed by the simulated hardware device 463.

The continuous integration server 410 can retrieve the version 435 of the verification program stored in the source control repository 430 and can transmit the retrieved version 435 of the verification program to the simulation environment 460. The retrieved version 435 of the verification program can be executed in the simulation environment 460 against the simulated hardware device 463 in order to test various aspects of the particular feature associated with the hardware manifest 450. For example, the version 435 of the verification program can be executed by a test harness that is attached to the simulated hardware device 463.

In at least some embodiments, results of the execution of the version 435 of the verification program against the simulated hardware device 463 can be reported back to the continuous integration server 410. In such an embodiment, the continuous integration server 410 can associate the results with the hardware feature manifest 450 and/or an identifier for the particular feature of the hardware device associated with the hardware feature manifest 450.

Although the example method 400 is described above in the context of simulation and a simulation environment requirement, the method can also be used in emulation scenarios as well.

As an alternative to using the simulation environment 460, the continuous integration server 410 can be configured to deploy the retrieved version 425 of the RTL definition in an environment where an ASIC will be created using the RTL definition. For example, an FPGA can be programmed using the retrieved version 425 of the RTL definition. In such embodiments, the retrieved version of the verification program 435 can be used to test the created ASIC. In at least some such embodiments, rather than a simulation environment requirement 453, the hardware feature manifest 450 can comprise a hardware resource requirement (not shown) that must be satisfied by the hardware (e.g., the FPGA, attached memory, etc.) that is used to create the ASIC.

Figure 5:
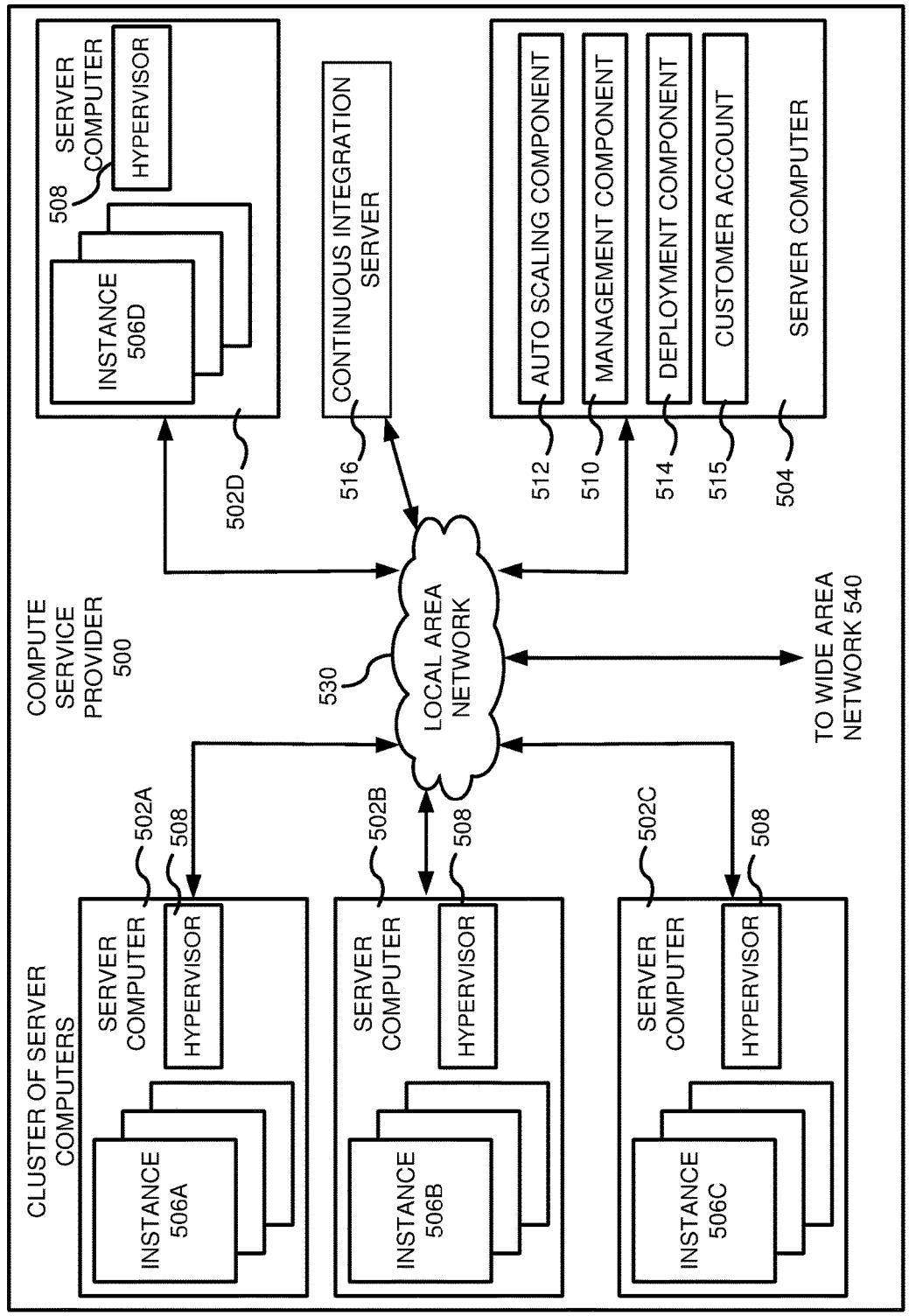
FIG. 5 is an example system diagram depicting a plurality of virtual machine instances and a continuous integration server running in a multi-tenant environment.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example, each of the servers 502A-502D can be configured to execute a hypervisor 508 or another type of program configured to enable the execution of multiple instances 506 on a single server. For example, each of the servers 502A-502D can be configured (e.g., via the hypervisor 508) to support one or more virtual machine slots, with each virtual machine slot capable of running a virtual machine instance (e.g., server computer 502A could be configured to support three virtual machine slots each running a corresponding virtual machine instance). Additionally, each of the instances 506 can be configured to execute one or more applications.

It should be appreciated that, although the embodiments disclosed herein with respect to compute service provider 500 are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multitenant environment. For example, the customer account information can include a unique identifier for a customer, a customer address, billing information, licensing information, customization parameters for launching instances, scheduling information, auto-scaling parameters, previous IP addresses used to access the account, etc.

A network 530 can be utilized to interconnect the server computers 502A-502D and the server computer 504. The network 530 can comprise Clos networks or other types of multi-tiered network fabrics. The network 530 can be a local area network (LAN) and can be connected to a Wide Area Network (WAN) 540 so that end users can access the compute service provider 500. It should be appreciated that the network topology illustrated in FIG. 5 has been simplified and that many more networks and network devices can be utilized to interconnect the various computing systems disclosed herein.

A continuous integration server 516 can be included in the compute service provider 500 to perform feature-based continuous integration operations as described herein. One or more feature manifests can be stored in the continuous integration server 516. Additionally or alternatively, the continuous integration server 516 can retrieve one or more feature manifests from one or more of the server computers 502 via the network 530. One or more source control repositories can be stored on the continuous integration server 516 and/or in one or more of the server computers 502. Additionally or alternatively, source control repositories can be stored in networked storage devices which are accessible by the continuous integration server 516 via the network 530. The continuous integration server 516 can retrieve versions of assets (such as RTL definitions, verification programs, operating programs, etc.) from the source control repositories which are identified by a feature manifest. The continuous integration server 516 can deploy versions of assets identified by feature manifests to one or more of the server computers 502. In at least some embodiments, the continuous integration server 516 can use the deployment component 514 of the server computer 504 to facilitate the deployment of retrieved assets.

Although the continuous integration server 515 is depicted in FIG. 5 as separate from the server computers 502, in some embodiments, the continuous integration server 516 can comprise one or more components of one or more of the server computers 502. For example, the continuous integration server 516 can be a part of one or more of the instances 506.

Figure 6:
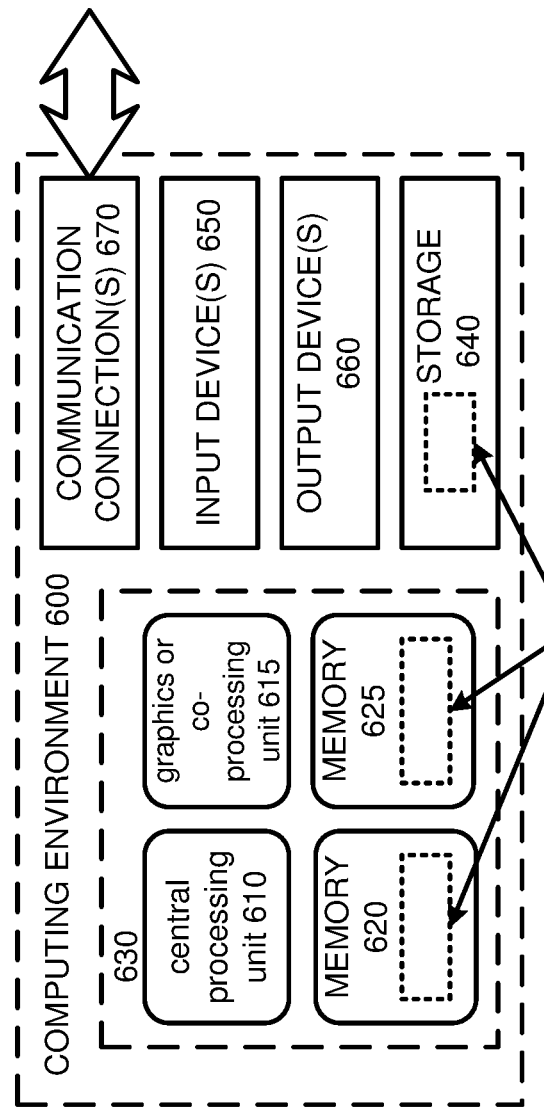
FIG. 6 is a diagram depicting a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.).

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s). In at least some embodiments, the memory 620, 625 can store all or part of one or more feature manifests (such as hardware feature manifests) and/or one or more source control repositories, as described herein.

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

In at least some embodiments, the computing environment 600 can be used as a continuous integration server, computing device, service, and/or server as described herein.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein. In at least some embodiments, the tangible storage 640 can store all or part of one or more feature manifests (such as hardware feature manifests) and/or all or part of one or more source control repositories, as described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-Specific Integrated Circuits (ASICs), Program-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system for feature-based continuous integration, the system comprising:
    a first source control repository storing a plurality of versions of a register-transfer-level (RTL) definition for an integrated circuit;
    a second source control repository storing a plurality of versions of a verification program for testing the integrated circuit;
    a third source control repository storing a plurality of versions of a program for operating the integrated circuit;
    a hardware feature manifest identifying:
        one of the versions of the RTL definition for the integrated circuit, wherein the one of the versions of the RTL is used to implement a feature of the integrated circuit,
        one of the versions of the verification program for testing the integrated circuit, wherein the one of the versions of the verification program comprises instructions for testing the feature of the integrated circuit, and
        one of the versions of the program for operating the integrated circuit; and
    a continuous integration server configured to:
        retrieve, based on the hardware feature manifest, the identified version of the RTL definition from the first source control repository,
        retrieve, based on the hardware feature manifest, the identified version of the verification program from the second source control repository,
        retrieve, based on the hardware feature manifest, the identified version of the program for operating the integrated circuit,
        simulate the integrated circuit using the retrieved version of the RTL definition and the retrieved version of the program for operating the integrated circuit, and
        use the retrieved version of the verification program to test the simulated version of the integrated circuit.

2. The system of claim 1, wherein:
    the hardware feature manifest further identifies a simulation environment requirement; and
    the continuous integration server is further configured to:
        identify a server computer that satisfies the simulation environment requirement, and
        use the server computer to simulate the integrated circuit using the retrieved version of the RTL definition.

3. The system of claim 1, wherein the continuous integration server is further configured to:
    receive a request comprising information identifying the version of the RTL definition stored in the first source control repository and the version of the verification program stored in the second source control repository; and
    create the hardware feature manifest based on the information received in the request.

4. The system of claim 1, wherein:
    the first source control repository and the second source control repository are managed by separate source management systems.

5. A computing device comprising one or more processors and a memory storing instructions that, when executed by the one or more processors, cause the computing device to perform operations, the operations comprising:
    retrieving a hardware feature manifest from a third source control repository;
    identifying, using the hardware feature manifest:
        a version of a register-transfer-level (RTL) definition for computing hardware, stored in a first source control repository, and
        a version of a verification program for testing the computing hardware, stored in a second source control repository;
    retrieving, based on the hardware feature manifest, the version of the RTL definition from the first source control repository; and
    retrieving, based on the hardware feature manifest, the version of the verification program from the second source control repository.

6. The computing device of claim 5, wherein the operations further comprise:
    simulating the computing hardware using the version of the RTL definition; and
    using the version of the verification program to test the simulated computing hardware.

7. The computing device of claim 6, wherein:
    the hardware feature manifest further comprises a simulation environment requirement; and
    the operations further comprise simulating the version of the computing hardware using a server computer which satisfies the simulation environment requirement.

8. The computing device of claim 5, wherein the operations further comprise:
    identifying, using the hardware feature manifest, a version of a program for operating at least part of the computing hardware stored in a third source control repository; and retrieving, based on the hardware feature manifest, the version of the program for operating at least part of the computing hardware from the third source control repository.

9. The computing device of claim 5, wherein the operations further comprise:
receiving a request comprising information identifying the version of the RTL definition of the computing hardware and the version of the verification program; and
generating the hardware feature manifest using the information received in the request.

10. The computing device of claim 5, wherein:
the version of the RTL definition of the computing hardware comprises a plurality of changes to the RTL definition of the computing hardware which is stored as one or more commits in the first source control repository.

11. The computing device of claim 5, wherein:
the first source control repository and the second source control repository are managed by separate source management systems.

12. The computing device of claim 5, wherein the operations further comprise:
programming a field-programmable gate array (FGPA) using the retrieved version of the RTL definition; and
executing the retrieved version of the verification program against the programmed FPGA.

13. A computer-implemented method, comprising:
receiving a request comprising a hardware feature identifier;
retrieving a hardware feature manifest associated with the hardware feature identifier from a computer-readable storage medium, wherein the hardware feature manifest identifies:
a version of a register-transfer-level (RTL) definition for a hardware device, stored in a first source control repository,
a version of a verification program for testing the hardware device, stored in a second source control repository, and
a computing resource required to simulate the hardware device;
retrieving the version of the RTL definition for the hardware device from the first source control repository;
retrieving the version of the verification program from the second source control repository;
identifying a server computer that contains the computing resource required to simulate the hardware device;
simulating the hardware device in the identified server computer using the retrieved version of the RTL definition;
deploying the retrieved version of the RTL definition for the hardware device, wherein the deploying the retrieved version of the RTL definition comprises emulating the hardware device using the retrieved version of the RTL definition; and
testing the deployed version of the RTL definition using the retrieved version of the verification program.

14. The computer-implemented method of claim 13, wherein the deploying the retrieved version of the RTL definition comprises creating an application-specific integrated circuit using the retrieved version of the RTL definition.

15. The computer-implemented method of claim 13, wherein:
the hardware feature manifest further identifies a version of a program for operating at least part of the hardware device, stored in a third source control repository;
the method further comprises retrieving the version of the program for operating at least part of the hardware device from the third source control repository; and
the deploying the retrieved version of the RTL definition for the hardware device comprises installing the retrieved version of the program for operating at least part of the hardware device.

16. The computer-implemented method of claim 13, further comprising:
receiving a request via a computer network, the request comprising:
the hardware feature identifier,
an identifier for the version of the RTL definition stored in the first source control repository, and
an identifier for the version of the verification program stored in the second source control repository;
creating the hardware feature manifest using the identifier for the version of the RTL definition stored in the first source control repository and the identifier for the version of the verification program stored in the second source control repository; and
associating the hardware feature manifest with the hardware feature identifier.

* * * * *